(12) United States Patent
Brown, III

(10) Patent No.: US 10,438,265 B1
(45) Date of Patent: Oct. 8, 2019

(54) SKINCARE LAYOUT DESIGN, MAINTENANCE AND MANAGEMENT SYSTEM AND APPARATUS

(71) Applicant: Traceurface, LLC, Dallas, TX (US)

(72) Inventor: Angus McLean Brown, III, Houston, TX (US)

( * ) Notice: Subject to any disclaimer, the term of this patent is extended or adjusted under 35 U.S.C. 154(b) by 0 days.

(21) Appl. No.: 15/862,333

(22) Filed: Jan. 4, 2018

Related U.S. Application Data

(63) Continuation of application No. 14/494,124, filed on Sep. 23, 2014, now abandoned.

(60) Provisional application No. 61/881,029, filed on Sep. 23, 2013.

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0601* (2013.01); *G06Q 30/0629* (2013.01); *G06Q 30/0631* (2013.01); *G06Q 30/0641* (2013.01)

(58) Field of Classification Search
CPC ................. G06Q 30/0601–0645; G06Q 30/08
USPC .............................................. 705/26.1–27.2
See application file for complete search history.

(56) References Cited

U.S. PATENT DOCUMENTS

| | | | |
|---|---|---|---|
| 2003/0065578 A1* | 4/2003 | Peyrelevade | A45D 44/005 705/14.54 |
| 2005/0135675 A1* | 6/2005 | Chen | G06T 11/00 382/162 |
| 2010/0281636 A1* | 11/2010 | Ortins | A46B 9/04 15/4 |
| 2013/0169827 A1* | 7/2013 | Santos | H04N 5/23229 348/207.1 |

OTHER PUBLICATIONS

Milnes, Hilary, Makeup brands testing augmented reality drive conversions, Mar. 28, 2016, Digiday, [https://digiday.com/marketing/makeup-brands-testing-augmented-reality-drive-conversions/] (Year: 2016).*

* cited by examiner

*Primary Examiner* — Resha Desai
*Assistant Examiner* — Lindsey B Smith
(74) *Attorney, Agent, or Firm* — Hitchcock Evert LLP

(57) ABSTRACT

Embodiments of the present disclosure provide systems, apparatus and methods for design creation, tracking and management utilizing a system network with a user interface device and a network server. Embodiments further disclose creation, tracking and management of skincare layouts. The device with a network communication component facilitating communication with a server. The device may operate to facilitate the creation of a skincare layout for a person and share the layout with the server. The server may include a database of information related to the users and skincare layouts as well as historical information, and the server may provide reminders, marketing and other communications based upon such information. Reports may be created to reflect the skincare layouts, product purchases, or other analytics regarding the information.

19 Claims, 10 Drawing Sheets

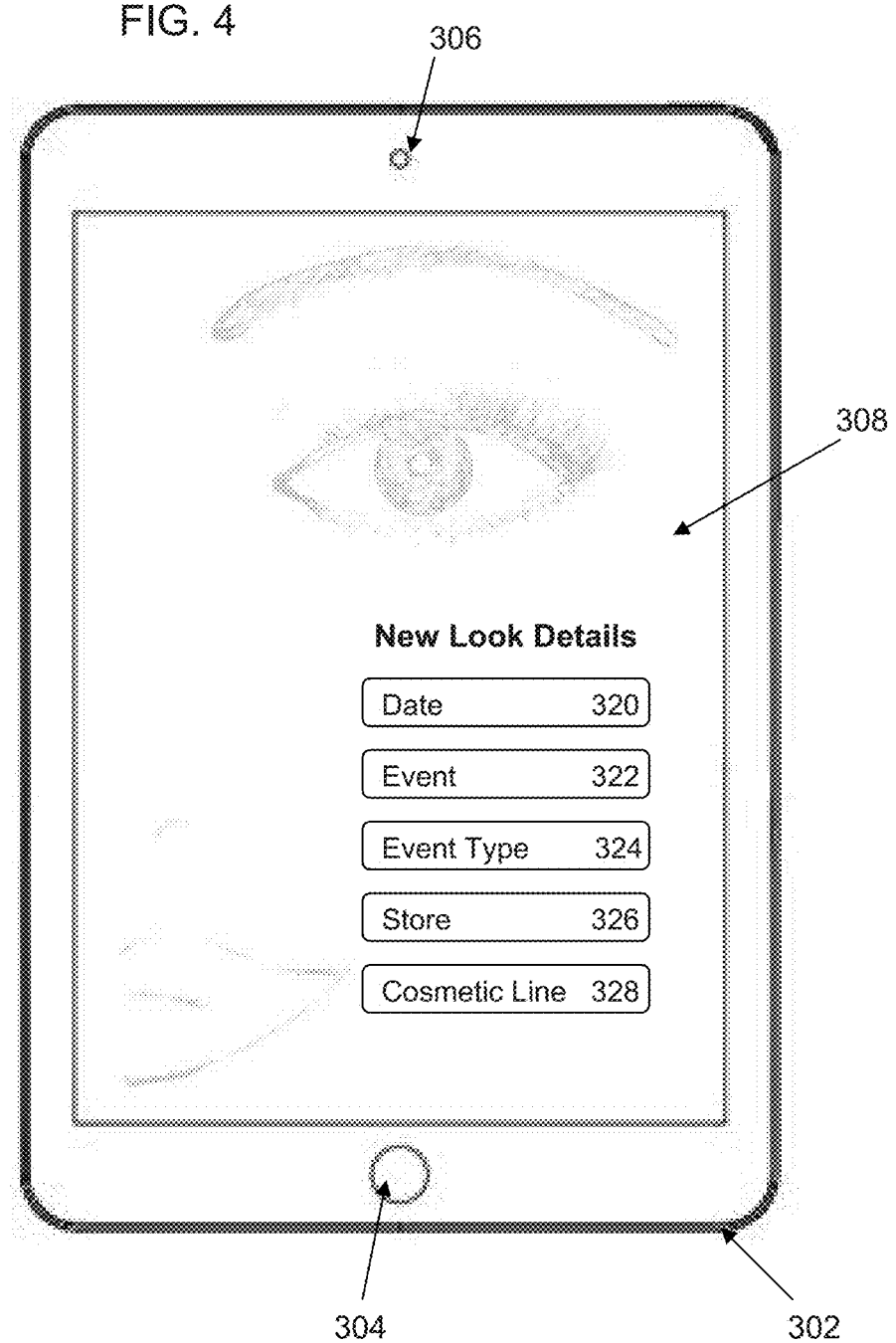

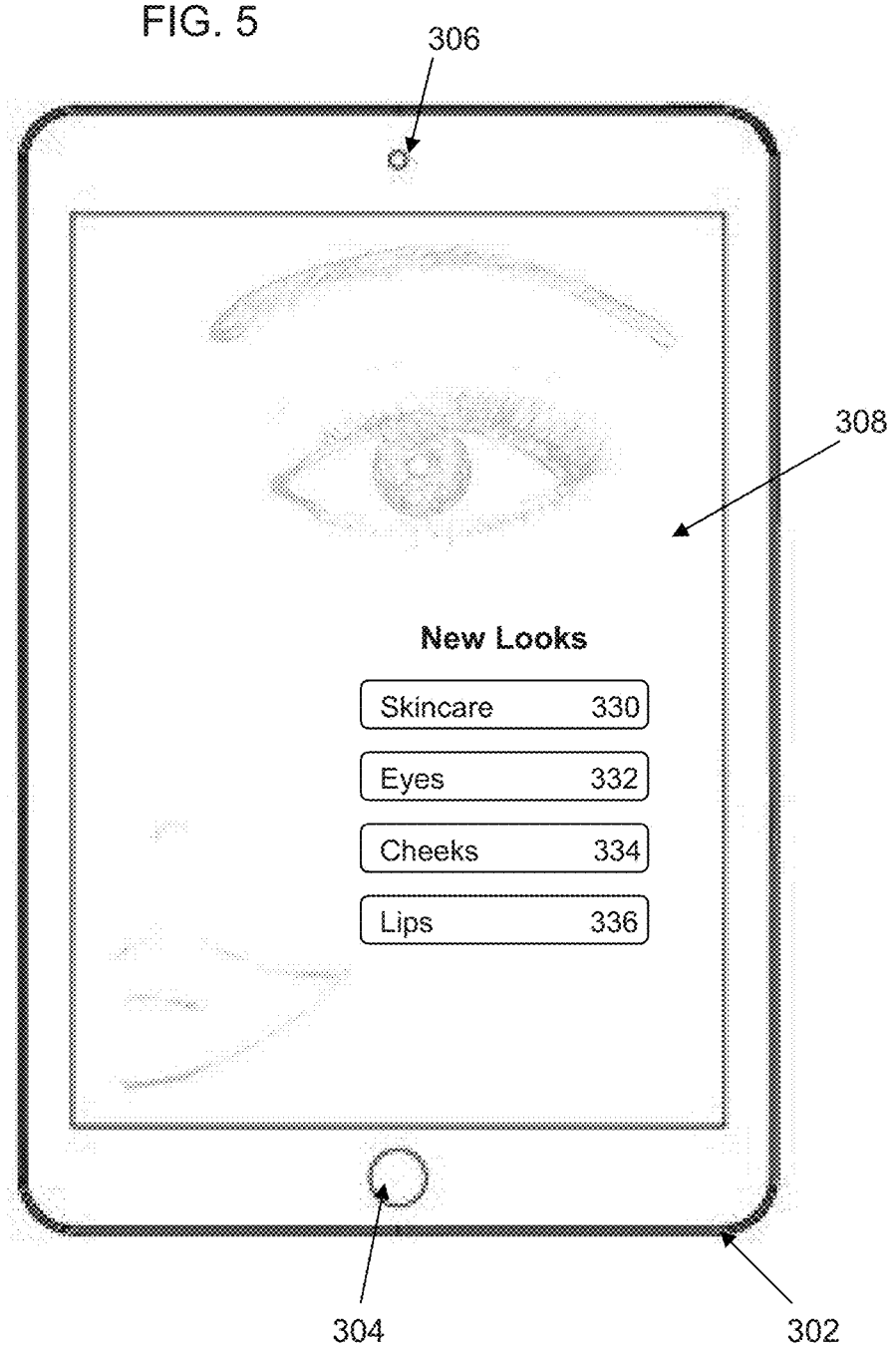

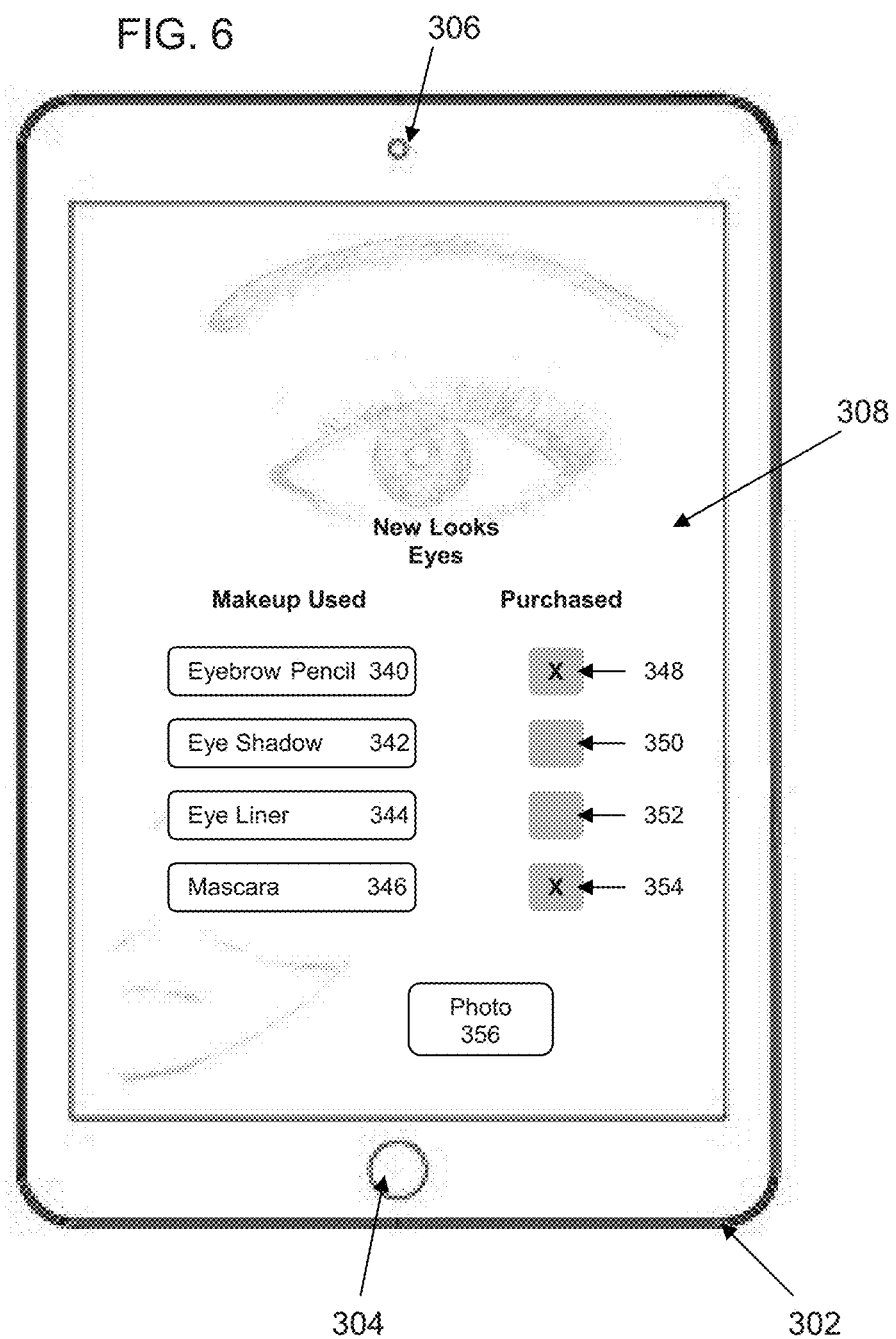

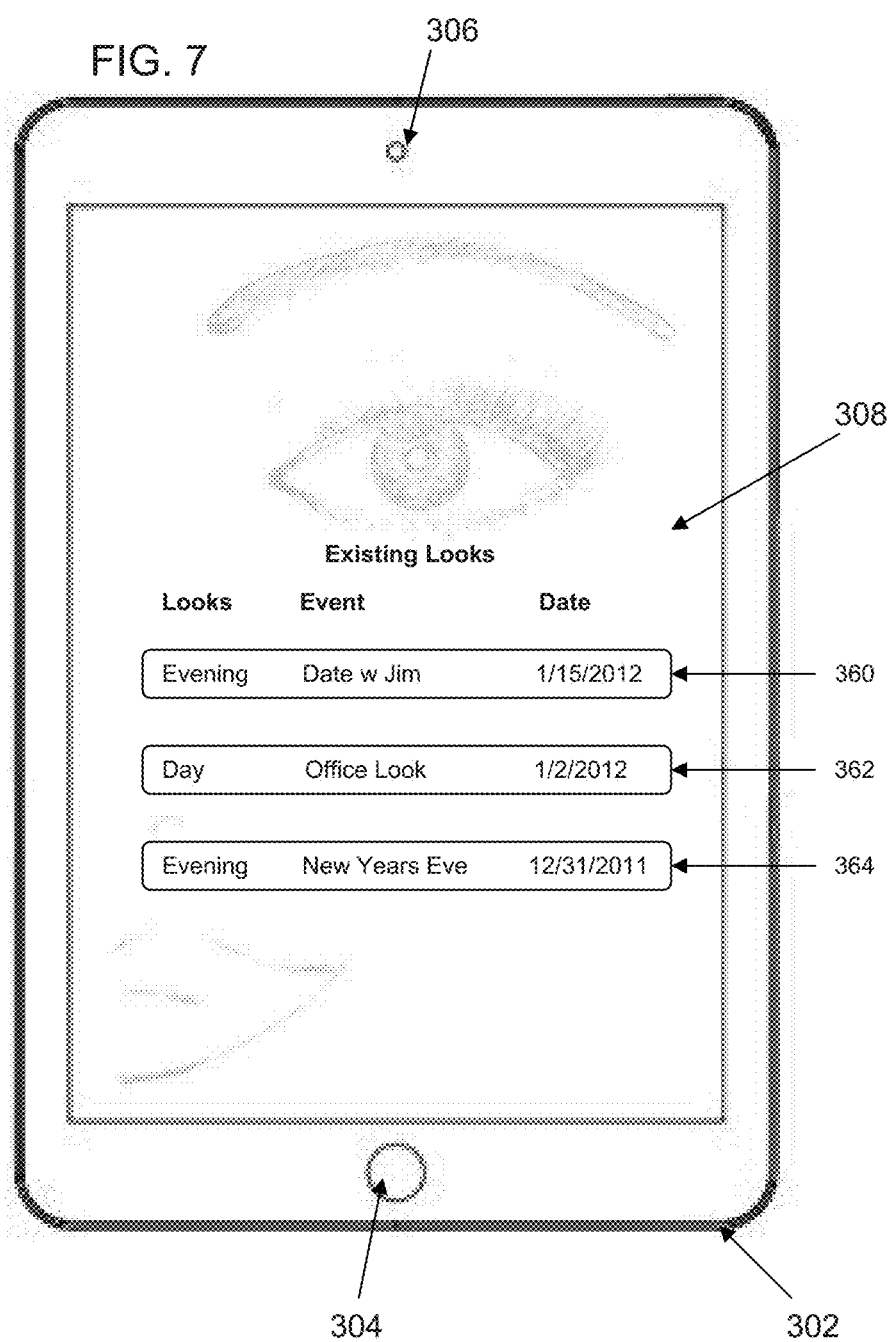

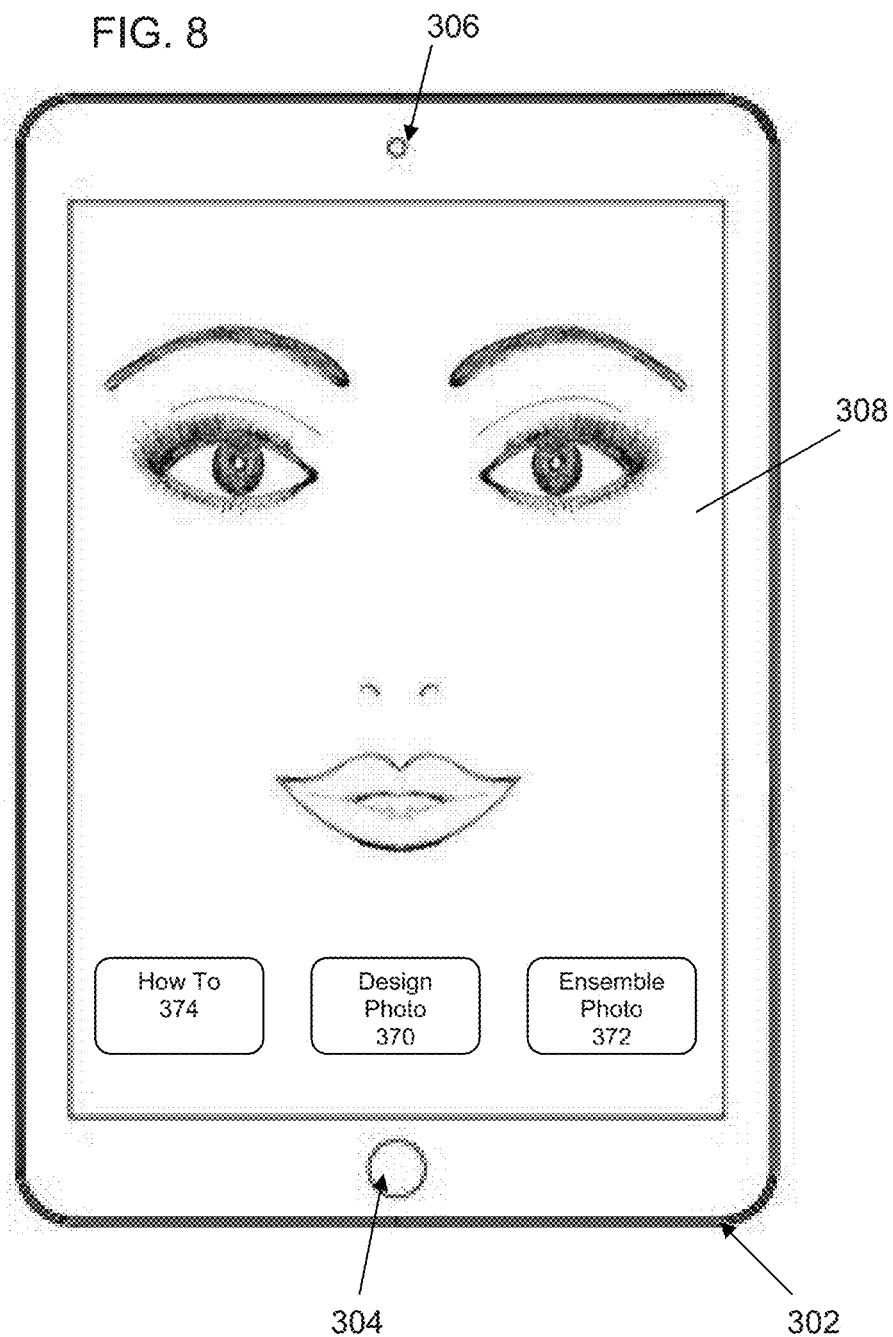

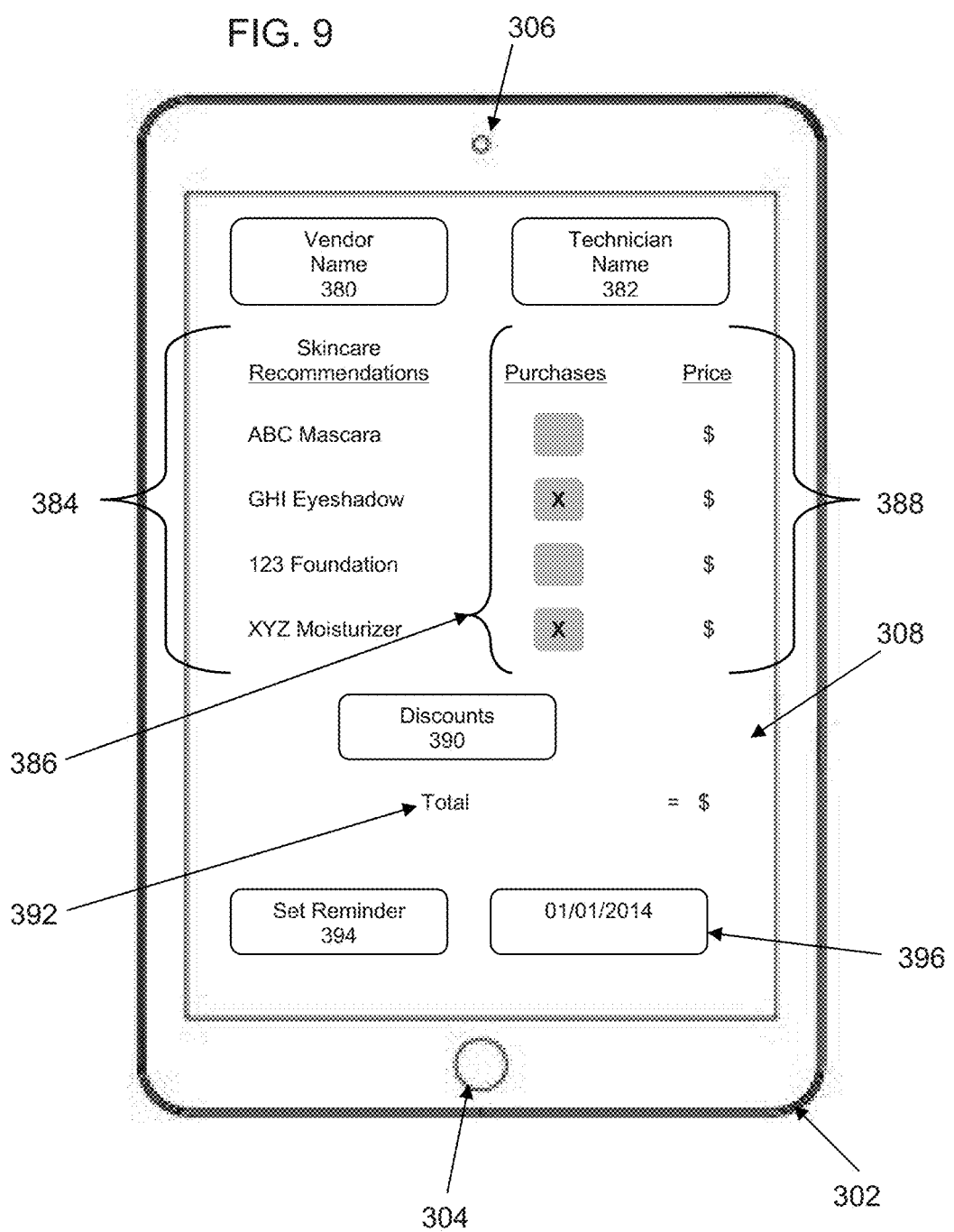

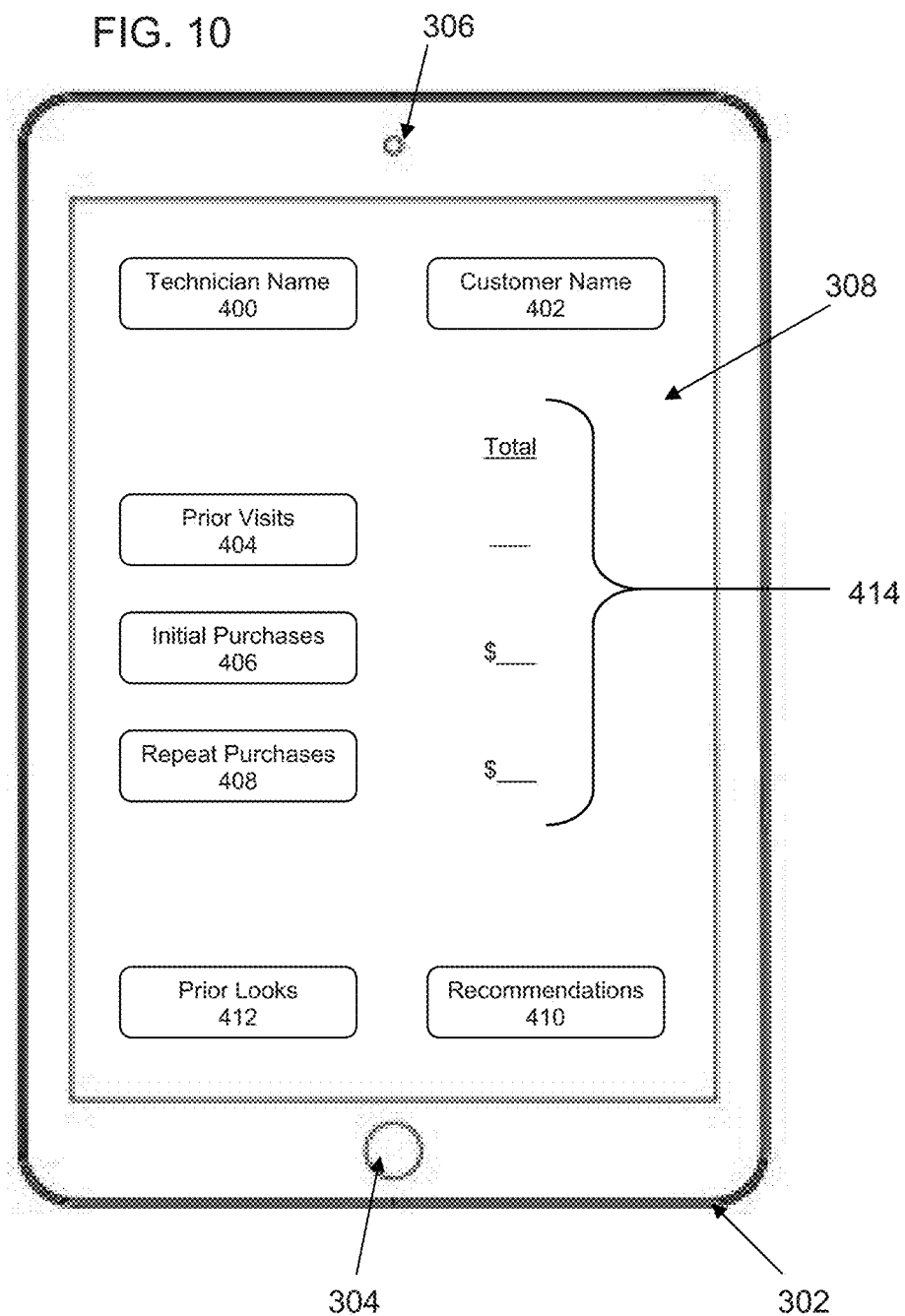

SKINCARE LAYOUT DESIGN, MAINTENANCE AND MANAGEMENT SYSTEM AND APPARATUS

CROSS-REFERENCE TO RELATED APPLICATION

This application claims the benefit of priority from U.S. patent application Ser. No. 14/494,124 filed on Sep. 23, 2014 which claims priority to U.S. Provisional Patent Application No. 61/881,029 filed on Sep. 23, 2013. Each priority application is incorporated herein by reference.

FIELD OF THE DISCLOSURE

The invention relates generally to the field of inventory management and design maintenance. More specifically, some embodiments relate to designing skincare layouts for people and managing the skincare layout through maintenance of the design and inventory used for creating the design.

BACKGROUND

Some people, skincare wearers, utilize cosmetics and other skincare products for a variety of purposes including for skin protection, treatments, concealment and/or creating a desired look. In some cases, the skincare wearer may take the time to work with another person, such as a skincare technician, to develop a skincare or cosmetic layout. During such a process, the skincare technician may use a paper having a face chart and product list section to illustrate the desired layout and list the products used to create the desired layout. The face chart and product list may be kept by the skincare technician and/or the wearer.

In some cases, the wearer may purchase one or more of the products identified on the list and recreate the layout at home. When the purchased products are used, the wearer may seek to purchase replacement products. Often the face charts have been misplaced or forgotten by the skincare technician and/or the wearer and neither person can identify the proper replacement product. This becomes more difficult when the wearer goes to a different store or location, the desired skincare technician is not available, and/or the product from the list has been discontinued. The skincare wearer may have to take the time to work with a new technician to develop a new layout or attempt to create the same layout without any guidance. During the process, the new layout may not account for products that the wearer still owns causing the wearer to purchase new products for the new layout which would otherwise be unnecessary.

SUMMARY

The present disclosure provides a system and method to design, maintain, and manage a skincare layout. The system and method increase efficiency in the skincare layout design and management process by maintaining a repository of skincare layouts and product information for use by a skincare technician, skincare wearer, and/or a skincare supply person or company.

Embodiments of the present disclosure include networked components including remote user interface components and at least one server component. The network may comprise wireless and/or wired components. Some remote user interface components may be utilized to input information, including a skincare design for a person, and output information, such as a skincare layout illustration, product list, technician information, wearer information, instructional information and/or product supply information.

In some embodiments, a server may be associated with a centralized database which acts as a repository of aggregated data from one or more remote user interface components. In some embodiments, the database may further include data supplied by other sources, such as product suppliers, instructional information suppliers, and other third parties.

In some embodiments, an apparatus operates as the user interface and the database repository. In some embodiments, the database may be specific to the apparatus comprising only information input or acquired directly by the apparatus. In other embodiments, the database may operate as a database for one or more networked devices.

In some embodiment, both the technician and the wearer have apparatuses of the system. The technician may develop and input the skincare layout, product list and other information, and the wearer may receive the information from the technician's device at one or more points during the process.

In some embodiments, a camera may be included to associate a picture of the wearer with the skincare layout with a generic illustration and/or product list related to the skincare layout. In some embodiments, the wearer may associate multiple pictures of the skincare layout or steps to create the skincare layout with a stored entry for that layout.

Embodiments of the method of the present disclosure include designing a skincare layout for a wearer and inputting the skincare layout a user device. Some embodiments may provide for designing and/or inputting the layout using a touch screen to create an illustration for the wearer. In some embodiments, a mockup of the design on an image of the wearer may be created in advance of or instead of applying the skincare layout to the wearer. In some embodiments, the design is created through application of the skincare products to the wearer, and modification of such design until a desired skincare layout is created. Following such a design process, the skincare layout may be input into the user device.

In some embodiments, the input process is iterative through a selection process associated with a software application. The process may include selecting an application area, such as the eyes or cheeks, selecting a skincare product, such as eye liner or base, selecting a color or pigment of the product and selecting a style of application or application restriction. In some embodiments, the design may be modified by altering any of the selections.

In some embodiments, the process will further create a list of products needed to create the layout. In some embodiments, the process will provide alternative products to consider for similar effects. In some embodiments, the process will provide links to the selected products and/or alternative products for information purposes or as points of purchase.

After creating the design in the device, the design may be associated with the wearer in some embodiments through identifiable information, a log in system, or an electronic recognition system. In some embodiments, the layout may be electronically provided and/or accessible to the wearer.

In some embodiments, the wearer may use controls or options associated with the layout to receive instructional information, product details, reminders and/or other information associated with the skincare layout.

In some embodiments, the system or method will account for historical information in creating the design, making product suggestions, issuing a list of products for purchase or for other reasons.

In some embodiments, the system or method may facilitate communication between a product supplier and a wearer. In some embodiments, the technician may receive information regarding the product use by the wearer.

A BRIEF DESCRIPTION OF THE DRAWINGS

Embodiments will now be described, by way of example only, with references to the accompanying drawings in which.

FIG. 4 a drawing of another embodiment of a device associated with the disclosure showing another illustrative screen;

FIG. 5 is drawing of another embodiment of a device associated with the disclosure showing another illustrative screen;

FIG. 6 is drawing of another embodiment of a device associated with the disclosure showing another illustrative screen;

FIG. 7 is drawing of another embodiment of a device associated with the disclosure showing another illustrative screen;

FIG. 8 is drawing of another embodiment of a device associated with the disclosure showing another illustrative screen;

FIG. 9 is drawing of another embodiment of a device associated with the disclosure showing another illustrative screen; and FIG. 10 is drawing of another embodiment of a device associated with the disclosure showing another illustrative screen.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
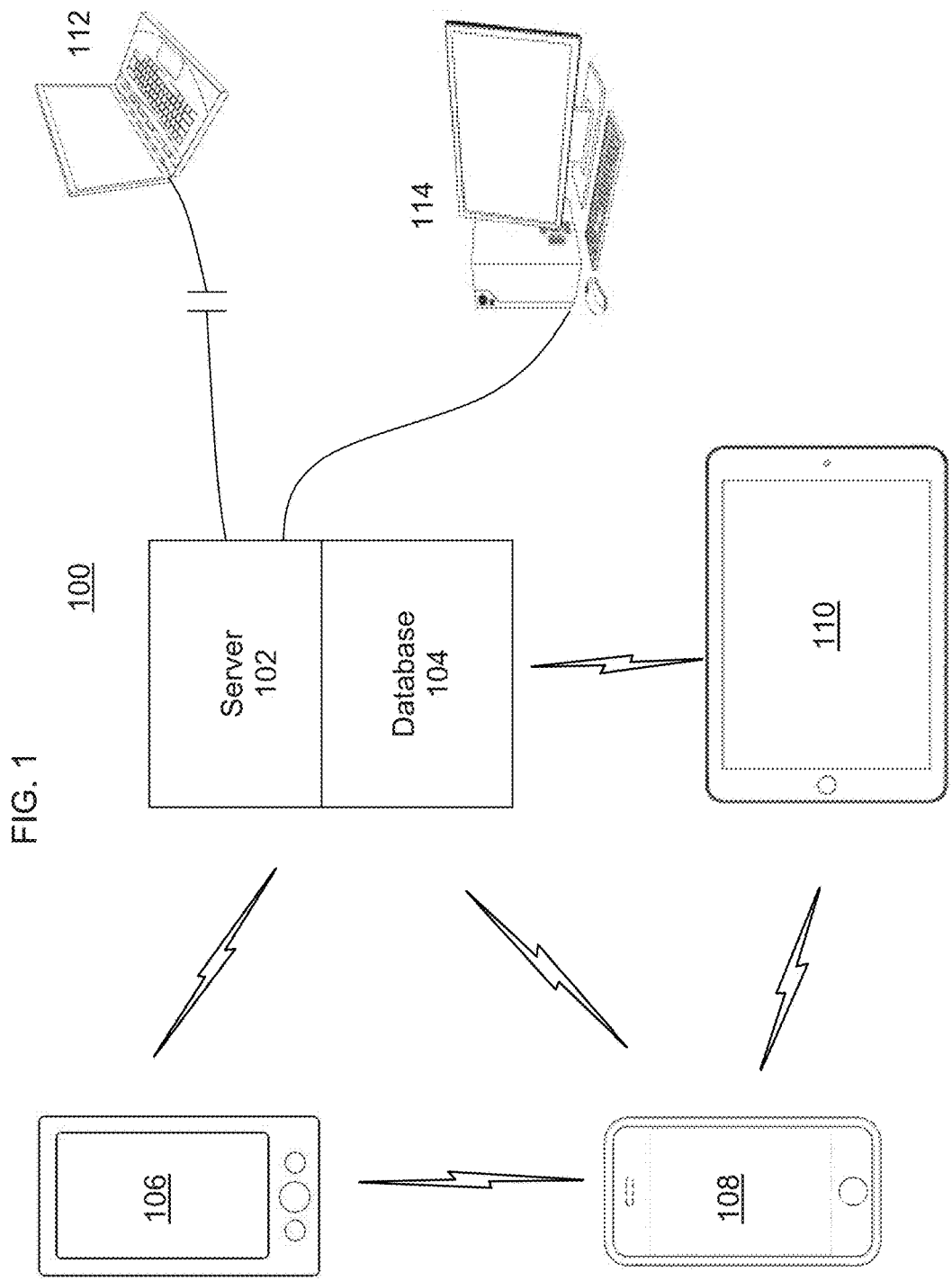
FIG. 1 is a drawing of an embodiment of a system of the disclosure.

FIG. 1 depicts a system 100 having networked components associated with each other by wireless and wired connections. One skilled in the art will recognize that any means of connecting components to allow communication signals to be transmitted may be implemented and remain within the scope and spirit of the present disclosure. System 100 includes a server 102 which is associated with a database 104. One skilled in the art will recognize that the server 102 may be any computing device capable for the operations described herein and remain within the scope and spirit of the present disclosure. The database 104 may comprise any electronic storage system or component which maintains information in an electronically accessible format and is capable of operation described herein. In some embodiments, system 100 may include multiple servers 102 and/or databases 104. For example, a cosmetics supply store with multiple locations may have servers 102 located at each location for local operation of the system 100, and also connected with a central server 102 at another location, such as a corporate office. In some embodiments, system 100 may be implemented through a cloud based design.

In some embodiments, the server 102 may be a host server maintained by a third party for access during operation. The server 102 may provide additional analytics or company information associated with the skincare products or design recommendations. For example, the server 102 may facilitate the scheduling of product replacement reminders based upon one or more factors relating to the product use or expiration information. For another example, a skincare product supply company may allow an independent skincare technician access to additional product details and promotions to improve the product usage and wearer experience. The third party may further provide and maintain the application software associated with system 100. One skilled in the art will recognize that the application may be provided as software accessible on a specified location, such as the server 102, downloadable from a storage device, stored in another component of the system 100, issued as a computer program product on a tangible storage medium, and/or otherwise provided or made available for use.

In the system 100, the server 102 is shown as wirelessly connected to a first smart phone 106, a second smart phone 108 and a tablet 110. Collectively the first smart phone 106, the second smart phone 108 and the tablet 110 may be referred to as mobile devices 106, 108 and 110. Each of the mobile devices 106, 108 and 110 shown has a display and a user interface. In some embodiments, the display operates as the user interface utilizing touch screen technology. In some embodiments, one or more of the mobile devices 106, 108 and 110 may also include a camera. In addition to the wireless connection with the server 102, the mobile devices 106, 108 and 110 may be connected wirelessly or via a wire to another one of the mobile devices 106, 108 and 110. For example, the second smart phone 108 is depicted as wirelessly connected to both the first smart phone 106 and the tablet 110. One skilled in the art will recognize that the three mobile devices are depicted to illustrate the variation of devices that may be used in implementing the system disclosed. Unless otherwise noted, the descriptions of mobile devices may be used interchangeably and the descriptions of use are for illustrative purposes only.

In addition to the mobile devices 106, 108 and 110, server 102 is also connected to a remote computer 112 and a local computer 114 through wired connections. In some embodiments, server 102 may be part of the local computer 114 or the remote computer 112.

Figure 2:
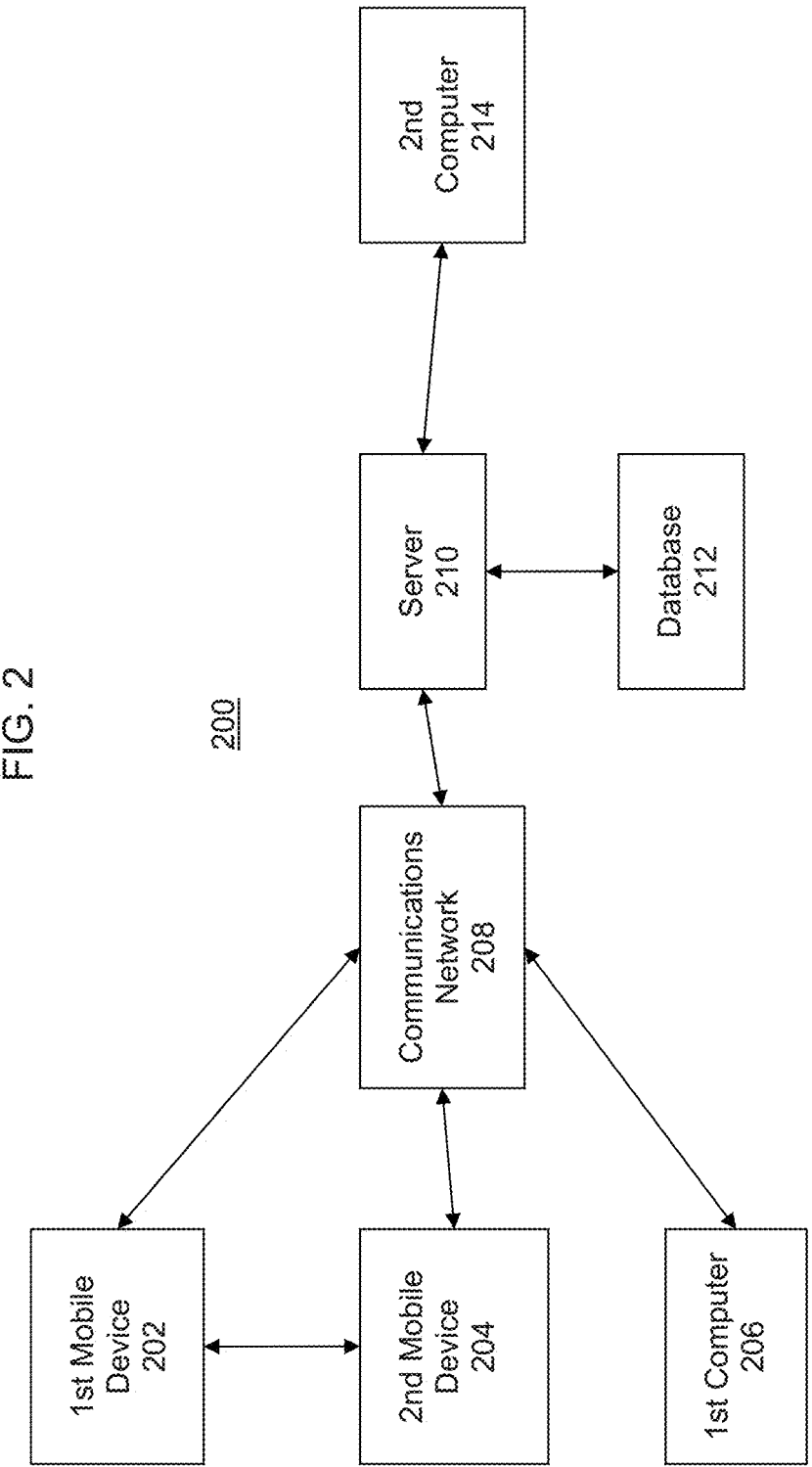
FIG. 2 is a block diagram depicting another embodiment of a system of the disclosure.

FIG. 2 depicts a system 200 having mobile components including a first mobile device 202, a second mobile device 204 and a first computer 206 networked via a communications network 208 with a server 210. Collectively the first mobile device 202, the second mobile device 204 and the first computer 206 may be referred to as mobile devices 202, 204 and 206. Each of the mobile devices 202, 204 and 206 may include a display, a camera and a user interface. In some embodiments, one or more of mobile devices 202, 204 and 206 may operate as a display only device without a user interface or camera. In some embodiments, the display operates as the user interface utilizing touch screen technology.

The mobile devices 202, 204 and 206 are each shown connected to the communications network 208 which may facilitate communication with the server 210. The mobile devices 202, 204 and 206 may also be connected to another one of the mobile devices 202, 204 and 206. For example, the first mobile device 202 is shown directly connected to the second mobile device 204. Unless otherwise noted, the descriptions of mobile devices may be used interchangeably and the descriptions of use are for illustrative purposes only.

System 200 shows the server 210 connected with a database 212. One skilled in the art will recognize that the server 210 may be any computing device capable for the operations described herein and remain within the scope and spirit of the present disclosure. The database 212 may comprise any electronic storage system or component which maintains information in an electronically accessible format and is capable of operation described herein. In some embodiments, system 200 may include multiple servers 210 and/or databases 212.

In some embodiments, the server 210 may be a host server maintained by a third party for access during operation. The server 210 may provide additional analytics or company information associated with the skincare products or design recommendations. For example, the server 210 may facilitate coordination of store supplies based upon tendencies of scheduled on site technicians. For another example, the server 210 may identify store promotions of similar products for consideration by the technician and/or wearer. The third party may further provide and maintain the application software associated with system 200. One skilled in the art will recognize that the application may be provided as software accessible on a specified location, such as the server 102, downloadable from a storage device, stored in another component of the system 200, issued as a computer program product on a tangible storage medium, and/or otherwise provided or made available for use.

In addition to the mobile devices 202, 204 and 206, server 210 is also connected to a second computer 214. In some embodiments, server 210 may be part of the second computer 214.

Figure 3:
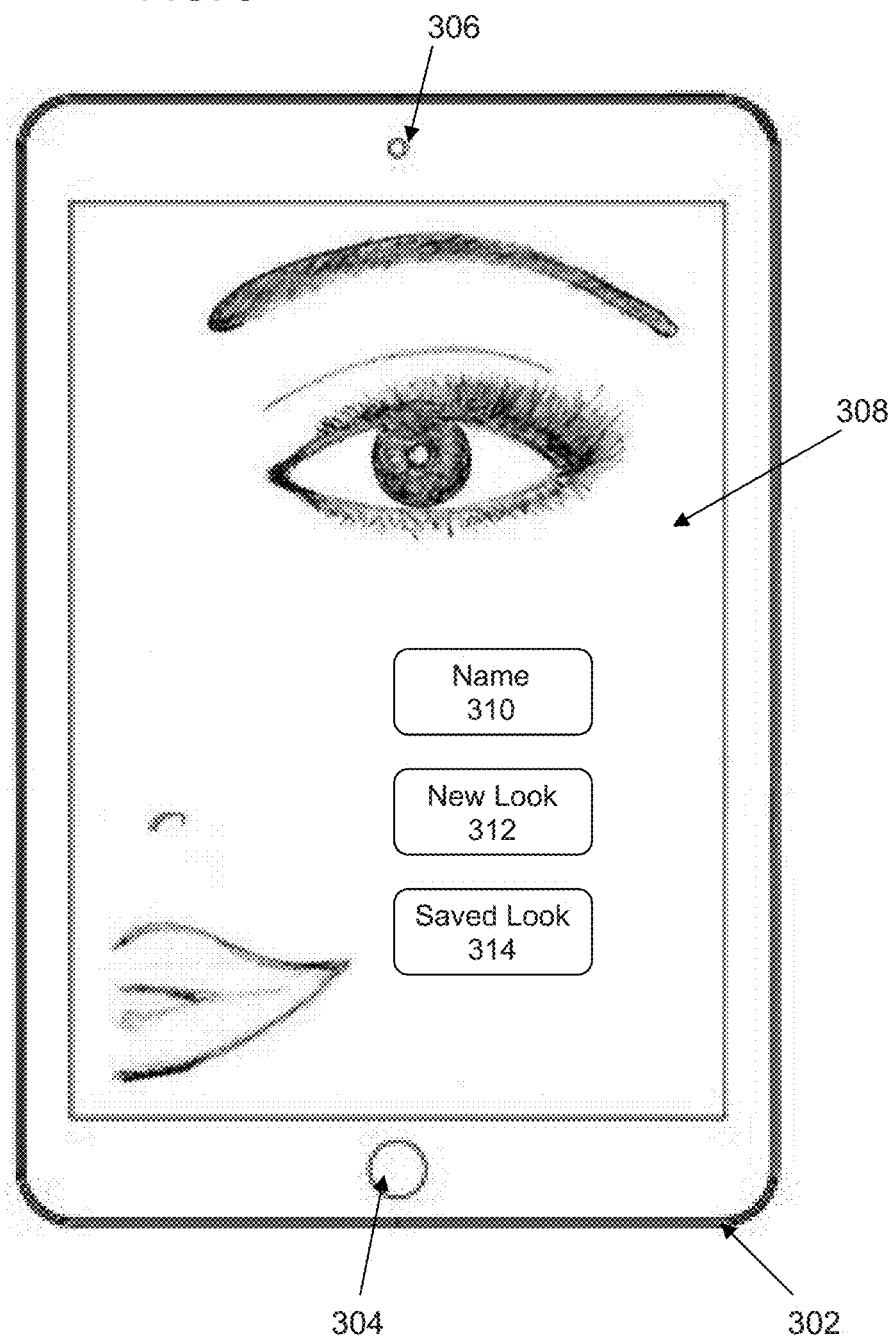
FIG. 3 is a drawing of an embodiment of a device associated with the disclosure showing an illustrative screen.

FIG. 3 depicts a tablet 302 operating an embodiment of software for designing and managing a skincare layout. For illustrative purposes, the tablet 302 will be discussed primarily as a technician's device; however, one skilled in the art will recognize that the tablet 302 may be associated with a company, a store, a technician, a wearer and/or another person. One skilled in the art will recognize that the tablet 302 is used as an exemplary device, and the application and operation discussed in the context of tablet 302 may be implemented on alternative components, such as a mobile phone, laptop computer, a computer station, and/or any other devices suitable to perform the operations described. In some embodiments, a combination of devices may be implemented to achieve the desired operational functionality.

In this embodiment, the tablet 302 includes a control button 304, a camera 306 and a display 308. The orientation, design and layout of the tablet 302 and the component parts are for illustrative purposes only. For example, in some embodiments, the control button 304 may be removed and/or replaced with an alternative control feature, such as a switch, a tactile control, an induction control, a voice control, an optical sensor, and/or other control feature. For another example, the camera 306 may be located on a different surface or side of tablet 302 than the display 308. In some embodiments, the tablet 302 may include multiple control buttons 304, cameras 306 and displays 308. In some embodiments, the tablet 302 may include additional components integrated into the tablet 302 or operably associated with the tablet 302, such as a microphone, a card reader and/or other device.

In this embodiment, the display 308 is a touch screen which may be utilized as part of a user interface in place of or in conjunction with other components such as button 304. In this embodiment, the display 308 shows a portion of a face in the background. In some embodiments, the face may be a generic representation for illustrative purposes. In some embodiments, the face may be based upon an image of the wearer. In some embodiments, the illustrative face may be selected from a series of options representing a common variety of face types or facial components which may be combined. In some embodiments, the user will select the illustrative face manually using the button 304 or other controls, such as the touch screen controls. In some embodiments, the application software automatically selects an illustrative face based upon a facial recognition analysis of a picture of the potential wearer.

In this embodiment, the display 308 also shows a series of touch screen controls depicted as buttons. In some embodiments, alternative touch screen controls may be used, such as slide controls, switches and other touch screen controls. In the embodiment shown, the buttons include a name button 310, a new look button 312 and a saved look button 314. In some embodiments, the display 308 may include one or more areas designated for advertising, promotions and/or other informative information. Such areas may vary among the variety of screens discussed herein. In some embodiments, such advertising, promotions and/or other information may be targeted to a user based upon information related to the user, the location and/or the operations.

In some embodiments, the name button 310 may be used to input or edit the name of a person for whom the skincare technician is creating, revising and/or reviewing a skincare layout. For example, the technician may touch the display 308 at name button 310 causing an input screen to appear allowing the technician to input the name of the next person. In some embodiments, the name button 310 may show the name of the current user of the tablet 302. The name button 310 may show the name of the last user or customer, a current user or customer and/or a scheduled user or customer. In some embodiments, the tablet 302 may include analytics to predict the next user or customer to identify with in the name button 310. In some embodiments, the tablet 302 may show one or more name buttons 310 identifying the technician, a customer, another user and/or names for generic faces used in some embodiments of the system. In some embodiments, the name button 310 depicts the active profile associated with a user, a customer, a technician and/or other person. In some embodiments, additional demographic information (e.g. a birth date, age, address, personal relationship, etc.) may be input, included and/or displayed with the name button 310 or as a result of selecting the name button 310.

In some embodiments, the name button 310 may open an application to identify a person using electronic systems. For example, the tablet 302 may be associated with a credit card reader which may be used to identify the person based upon a reading of their credit card. For another example, the application may utilize the camera 306 to image the person and analyze the image using a facial-recognition software to identify the person. In some embodiments, the facial-recognition software may be limited to an analysis of a database of tablet 302 and/or otherwise associated with tablet 302. The applications for identifying a person may vary and remain within the scope and spirit of the disclosure.

In some embodiments, the new look button 312 may be used to initiate a process for creating a new look for a skincare design for a person. For example, pressing the new look button 312 may cause a new screen to appear for identifying an initial face or starting point for a new look. In some embodiments, the new look button 312 may initiate a page for naming the new look. In some embodiments, the new look button 312 may initiate a page for choosing a photo or taking a photo of the person for whom the design will be created.

In some embodiments, the saved look button 314 is used to identify a preexisting skincare design. The preexisting skincare design may be a partial design or a completed design. In some embodiments, the preexisting skincare design is used to illustrate potential looks for customers to discuss before beginning the design of a new look. For example, a skincare technician may store a series of exemplary looks for different face types and purposes in order to show a person looking for a new design options and/or considerations for developing a new design. In some embodiments, the saved looks are associated with the identified person or the active profile.

In some embodiments, the saved look may be used to efficiently identify a desired look by a customer and assist the customer in repurchasing one or more products associated with the saved look. In some embodiments, the saved look may be used by the technician and the skincare customer to identify existing products used by the customer, and tailoring an updated or revised look incorporating one or more existing products.

FIG. 4 depicts the tablet 302 as discussed above which is showing another application page for illustration. In this embodiment, the display 308 depicts a page relating to new look details and a series of touch screen controls depicted as buttons. In some embodiments, the screen shown in FIG. 4 may be reached from the prior application page by pressing the new look button 312. The buttons on this new look page include a date button 320, an event button 322, an event type button 324, a store button 326 and a cosmetic line button 328. In some embodiments, one or more of the buttons disclosed herein may be display blocks only which may not be utilized as a button.

In some embodiments, the date button 320 may be used to input or edit the date in which the new look skincare layout is created. For example, the technician may touch the date button 320 causing an input screen to appear allowing the technician to input the current date. In some embodiments, the date button 320 may automatically show the current date. The date button 320 may be limited to a display only showing the current date or timestamp associated with the new look. In some embodiments, the date button 320 may include additional time information, such as start times. A database associated with the tablet 302 may record additional time information including a stop time, active operation time on the tablet 302, time associated with sales activity and/or other time or time-related information.

In some embodiments, the event button 322 may be used to identify a specific event for which the new look skincare layout is being designed. For example, the specific event may be an anniversary dinner, a banquet, an afternoon at the track, a job interview, a wedding or any other event. One skilled in the art will recognize that skincare layouts may vary depending on the specific event and desired look for such an event. For example, a skincare layout for a day at the park may include certain cosmetics which incorporate sunscreen characteristics to protect the face from the sun. In addition, the colors and accents used for a day in the park may be vastly different from those used for a formal banquet. As discussed with other buttons herein, the event button 322 may operate in any number of manners and remain within the scope and spirit of the present disclosure. In some embodiments, a window may appear for inputting the specific event. In other embodiments, a new screen may appear for inputting the specific event.

The embodiment shown also depicts the event type button 324 which may be used to classify the specific event into a category. Such categorization may allow additional customization and organization to the application. For example, the event type button 324 may allow for the user to select from a series of provided options, such as daytime looks, evening looks, special occasions and/or other options, and/or one or more customizable look categories.

In some embodiments, the event button 322 and the event type button 324 may be consolidated into a single button to allow the specific event and/or the event type to be identified. For example, a user may press a consolidated button to open a window which facilitates inputting a name for the event and a scrollable series of classifications for the new look.

In some embodiments, the event button 322 and/or the event type button 324 may relate to an event for the technician to design skincare layouts of others. For example, the technician may be invited to work at a fall make-up festival at a store, and the event button 322 may be used identify the fall make-up festival.

In the embodiment shown, the display 308 also depicts the store button 326. The store button 326 may be used to identify the store in which the technician is designing the new skincare layout and/or a store associated with the skincare technician. In some embodiments, the selection of a store may associate that store with the new look entry for future reference. In some embodiments, the selection of the store may allow the technician to receive payment based upon sales associated with the designed skincare layout. In some embodiments, the store identification may be used as a reminder for the person for whom the skincare layout was designed.

In the embodiment shown, the cosmetic line button 328 may be used to identify the cosmetic line which the technician is using to design the new skincare layout. In some embodiments, the cosmetic line button 328 may be limited to operating as a display showing the available cosmetic line. For example, a cosmetic company may hire a technician to work at a convention to design skincare layouts using only the cosmetics approved by that company and provide tablet 302 with the cosmetic line assigned for cosmetic line button 328. In some embodiments, the selection of the cosmetic line may allow the technician to receive payment based upon sales associated with the designed skincare layout. In some embodiments, the cosmetic line identification may be used as a reminder for the person for whom the skincare layout was designed.

Some embodiments of the application may include an alternative series of options and/or controls than those depicted by buttons 320, 322, 324, 326 and 328. In some embodiments, this screen may provide a series of blanks which may be completed by a user to identify the desired information regarding the selected look. In some embodiments, the application will provide default information regarding desired categories of information. In some embodiments, the application will only allow modification of certain information. In some embodiments, the selectable information may be controlled by a management system. For example, technicians working for a given store may receive tablets 302 for providing skincare design services to customers, and the operation of such tablets 302 may be restricted by the store management to only allow certain new looks to be created. Embodiments may facilitate providing the management controls manually using an administrator access, through a wireless or hardwired connection from a management computer to the tablet 302, using a management network portal associated with the tablet 302 and/or other management mechanisms. In some embodiments, the application may restrict selections based upon the location of the tablet 302, the wireless network connected to the tablet and/or based upon other thresholds. For example, the store button 326 may not be modifiable as long as the tablet 302 is connected to a given store's wireless network.

In some embodiments, the information provided in setting up the new skincare design may be utilized for informing others of pertinent information. For example, a woman may share her skincare layouts with her husband so that he would know what skincare products to purchase when at a given store. In some embodiments, the system may provide an alert to the husband as a gift suggestion based upon the anticipated time for replacing a given cosmetic. Utilizing the information provided in the new look details screen in the application, the gift suggestion may provide the husband with the store information, cosmetic line, event information and other potentially relevant information. In such an embodiment, the information may be further tied to additional marketing information, such as sale alerts tied to the select cosmetic line, store hours, technician availability and/or other information.

FIG. 5 depicts the tablet 302 as discussed above which is showing another application page for illustration. In this embodiment, the display 308 depicts a page relating to options for developing a new look and a series of touch screen controls depicted as buttons. In some embodiments, the screen shown in FIG. 5 may be reached from the prior application page by completing the input of information. The buttons on this new look page include a skincare button 330, an eyes button 332, a cheeks button 334 and a lips button 336. The options provided herein for developing a new look are for illustrative purposes and may be modified in any number of manners, such as removing options, replacing options, adding options and/or other modifications, and remain within the scope and spirit of the present disclosure.

In some embodiments, the skincare button 330 may open a window or an alternative screen that allows information relating to the skincare options to consider and/or selected by the technician and/or customer for skincare. For example, upon selecting the skincare button 330 the technician may input recommendations for sunscreen based products, cosmetic removal products, skin rejuvenation products and/or other skincare treatment products. In some embodiments, such recommendations may be used to facilitate reward programs for the technician.

In some embodiments, the eyes button 332 may open a window or an alternative screen that allows information relating to the eye cosmetic options to consider and/or selected by the technician and/or customer during the design of a new look. For example, upon selecting the eyes button 332 the technician may input recommendations for products and looks for a person's eyes which may be reviewed by the customer prior to selecting an option to try. In some embodiments, the technician may create a new look for a customer through application of various products to the customer. Upon determining a preferred look from a combination of products, the technician may use the tablet 302 to input information about the selected look. As part of the process, the technician may press the eyes button 332 to input the information regarding the selected design for the eyes for that customer.

In some embodiments, the eyes button 332 may be used to input information relating to cosmetics for areas around the eyes, such as the eyebrows. In some embodiments, the application may include separate button options for each portion of the eye.

The operation of the cheeks button 334 and the lips button 336 may operate similar to the skincare button 330 and/or the eyes button 332 as described above. For example, the cheeks button 334 may open a window or an alternative screen that allows information relating to the cheek cosmetic options and the lips button 336 may open a window or an alternative screen that allows information relating to the lips cosmetic options. For example, upon selecting either the cheeks button 334 or the lips button 336 the technician may input recommendations for products and looks for a person relating to the cheeks or lips which may be reviewed by the customer prior to selecting an option to try.

In some embodiments, one or more of the buttons disclosed herein may be display blocks only which may not be utilized as a button. In some embodiments, the application may include one or more alternative control features. For example, the application may provide one scrollable selection from which all the potential options are operable from the scroll feature. For another example, instead of the buttons 330, 332, 334 and 336, the partial face shown in the display 308 may be used to select options. In such embodiments, pressing the depicted eye may operate in the same manner as the eyes button 332.

FIG. 6 depicts an exemplary application screen in display 308 for the new look details for the eyes. In this embodiment, the screen includes information boxes to identify the makeup and/or skincare product used in the new look design. In this embodiment, the information boxes include an eyebrow pencil box 340, an eye shadow box 342, an eye liner box 344 and a mascara box 346. Embodiments of the detail pages may include any number of a variety of options related to skincare products used in a new look and/or recommended for a customer. In some embodiments, an eyes detail page may include a modified version of the options depicted. In addition, embodiments of the detail pages may be tailored, customized and/or designed for a variety of purposes.

In the embodiment shown, the makeup is identified in generic terms for illustrative purposes. In some embodiments, each information box 340, 342, 344 and 346 may provide additional detail regarding the specific selected makeup and/or skincare product. For example, the eye shadow box 342 may identify the product type (e.g. eye shadow), a brand name (e.g. Lavender Shimmer) and the distributing company (e.g. ABC Skincare Company). In some embodiments, each information box 340, 342, 344 and 346 may operate as buttons which will open a window, screen or page which provides additional specific details regarding the used and/or recommended skincare product.

During the design process, a technician may operate the information boxes 340, 342, 344 and 346 using the user interface of the tablet 302 in order to select specific skincare products. For example, the technician may touch the eyebrow pencil box 340 to open a selection screen to identify a specific type of pencil and a specific color. The application may then alter the look of the eye illustrated in the display 308 to reflect the changed eyebrow pencil. This process may be repeated until the customer identifies a preferred look for the eyebrow pencil. This process may also be repeated for other skincare design options to create a preferred skincare design layout.

In some embodiment, the details screen may be used in the design process to illustrate skincare application methods and/or looks. For example, the application may provide information for creating a light sweeping application of the eye shadow. In some embodiments, the illustrative face may be toggled to the forefront whereby the technician may layout a specific application for each skincare product. In some embodiments, the tablet 302 may operate with additional components, such as brushes, styluses and other components, which may be used to illustrate the type of application for the customer. In some embodiments, the illustrative application of each component may be stored for later use as a reminder of the designed application procedure for the customer.

In addition, the embodiment shown depicts a series of purchased boxes 348, 350, 352 and 354 which may indicate whether the associated product was purchased by the customer and/or whether the customer indicated their intent to purchase the associated product. In some embodiments, the user may toggle each of the boxes 348, 350, 352 and 354 between a purchased and not purchased option. In some embodiments, the application may include other options from which the user may select. For example, the options may include indications for already owned products, delayed purchases, tentative purchasing decisions which may need to be revisited at a selected time and/or other options.

In some embodiments, the purchasing information may be communicated between the tablet 302 and a transaction computer which facilitates the purchasing of products. For example, after completing the new look design and determining which products the customer is purchasing, the technician may press a button to transmit the purchasing information with specific product identification information to a transaction computer. A person operating the transaction computer may open the purchasing information details to facilitate gathering the products and executing the purchase transaction with the customer. In such a system, the transmission of information may include or trigger the transaction computer to show inventory management information to efficiently identify the products and locations to retrieve the desired products. In addition, the information may automatically populate the sales transaction information to reduce the opportunity for errors to occur in the reentry process. In such a system, the efficiency of the technician may be improved by eliminating steps associated with the sales transaction process and/or facilitating additional help in conducting the sales transaction process.

In some embodiments, the application on the tablet 302 may also facilitate the sales transaction process. For example, a technician or other user of the tablet 302 may indicate which products a customer has decided to purchase using the boxes 348, 350, 351 and 354. Embodiments of the application may include a separate button to initiate a purchase transaction and/or an automatic purchasing screen which appears at one or more defined points in the design process. For example, upon completion of the design process, a purchasing screen may appear if any purchase indications were made during the design process. The tablet 302 may then be used to facilitate purchasing products through the store, an online system and/or directly with a skincare supplier. In some such embodiments, the tablet 302 may include an additional payment processing device, such as a credit card reader.

In some embodiments, the transaction computer may communicate actual purchase information to the tablet 302. For example, the transaction computer may indicate that the customer chose to purchase an eyebrow pencil and mascara, and the application may update the boxes 348 and 354 to indicate such purchases.

In some embodiments, the information associated with each of the information boxes 340, 342, 344 and 346 and the purchase boxes 348, 350, 352 and 354 may not be shown on the default view of this page. In such embodiments, a separate control may allow a user to elect whether to show such boxes. The application screen may show an illustrative view of one or both eyes with the looks created by the selected skincare products.

In some embodiments, an illustrative view of an eye with the selected skincare products may include controls to allow the information regarding such products to be seen in a window, a screen, overlaid on the illustrative view, on another page and/or using another display or output mechanism. For example, a user may touch the eyelashes in the illustrative display triggering a window to open showing the detailed information regarding the selected mascara and whether such mascara was purchased by the customer and/or whether the customer indicated their intent to purchase the mascara. In addition or as an alternative, upon touching the eyelashes, a speaker of tablet 302 may provide a description of the selected makeup.

In some embodiments, the application screen may include a photo button 356. The photo button 356 may allow the user to take a picture of the new design layout using the camera 306 in some embodiments. For example, pressing the photo button 356 may open the operation application for camera 306 and the application may associate the picture with photo button 356. In some embodiments, the photo button 356 may facilitate selection of a previously taken photo for reference with the new look. For example, a user may take a series of photos using the tablet 302 with camera 306. The user may then select the photo that best shows the design layout for the eyes for association with the screen depicted in FIG. 6. The user may continue to associate a variety of photos with different application screens as applicable. In some embodiments, the photo button 356 may be used to view a previously associated photo. In some embodiments, the details screen may not include any photo options. In other embodiments, the photo option may be replaced with one or more alternative options related to the design layout, such as a video clip, an audio file describing the layout and/or another mechanism to detailing the design layout.

FIG. 7 depicts another exemplary application screen in display 308 for existing looks. In some embodiments, the existing looks screen may be accessed by pressing the saved looks button 314 shown in FIG. 3. In this embodiment, the screen includes information boxes 360, 362 and 364 to identify the existing looks saved in the system. The information boxes 360, 362 and 364 depict information regarding a look type, an event for which the look was previously designed and/or used during and a date associated with the look design and/or use. For example, information box 360 identifies the existing look as an evening look for a date with Jim which was created on Jan. 15, 2012.

In some embodiments, a technician may have provided the information regarding the creation of the design and the associated event for which it was created. In some embodiments, the skincare customer may input various information regarding the designed existing looks. In some embodiments, the user may update information based upon their use of the designed looks. For example, a technician may have created the evening look described in box 364 in anticipation of a work holiday party, and the user may update the information to indicate that she last wore the look to a New Year's Eve party with friends.

In some embodiments, the system may track updates to the system regarding specific looks. For example, the system may track how often the user indicates a given look is implemented. In some embodiments, such information may be utilized for tracking the anticipated need for refilling one or more products. In some embodiments, the information may be used at a later date to influence additional skincare design layouts. For example, a technician may review the frequency in which a design was used as an indicator of how much a person likes that style of design. When such information is aggregated over a number of looks, a technician may be able to better tailor the subsequent designs to a user's preferences.

In some embodiments, each information box 360, 362 and 364 may operate as buttons which will open a window, screen or page which provides additional specific details regarding the used and/or recommended skincare product. For example, the additional details may include a history of the design including its creation, modification, use and/or other historical information regarding the selected design. In some embodiments, selecting one of the information boxes 360, 362 and 364 may open a new page showing the designed look associated with the selected information box. For example, when box 362 is selected the tablet may depict an electronic face chart illustrating the designed office look.

In some embodiments, the details may include information regarding the skincare design technician, store, products and/or other information. For example, the system may provide information indicating whether one or more of the products used in the design need to be refilled. A user may select a design and determine whether they will apply the selected design based upon the predicted product availability shown in the system. The system may aggregate product usage details associated with a variety of designs and expected rates of use for each product to provide a prediction of the time to refill the product and/or of the likelihood that the product is empty.

In some embodiments, a technician may use one of the identified existing looks as a starting point to create a modified skincare design layout. For example, the customer may ask the technician to create an anniversary look based upon the existing look for the date with Jim in box 360. The technician may select the existing look for the date with Jim in box 360 and use a control to open a window, page and/or screen for modifying the existing look or creating a new look based upon the existing look.

FIG. 8 depicts another exemplary application screen in display 308 depicting a specific look. In some embodiments, this screen may be accessed by pressing one of the existing looks boxes 360, 362 and 364 shown in FIG. 7. In some embodiments, this screen may be accessed through other means and/or points of entry, such as a main page and/or an illustrative page in the design process. The face shown in display 308 may be an illustrative depiction of one or more parts of the designed look depending on the step at which the page is accessed. For example, during the design process, a technician may show the current status of the design while discussing the next options with the customer. For another example, the user may use this page to review a completed look to review whether or not to proceed with using such a look on a given occasion.

In addition to the illustrative embodiment of the face, some embodiments of the application may include additional control features. For example, the embodiment shown includes a design photo button 370, an ensemble photo button 372 and a how to button 374. Other embodiments of the application and/or screen may include a modified set of options and/or control features. In some embodiments, these buttons 370, 372 and 374 may be used to initiate the creation of additional information and/or association of additional information relating to the associated face shown in display 308. For example, pressing the design photo button 370 may open a camera feature allowing the user or technician to take a picture using camera 306 of the skincare design. For another example, pressing the how to button 374 may facilitate the creation of an instruction set to creating the skincare design shown. In some embodiments, the buttons 370, 372 and 374 may be used to open a new window, screen and/or page to provide additional information, such as a photo of the skincare layout, a photo of the skincare layout with the ensemble for the event, instructive information and/or other information.

The operation of the buttons 370, 372 and 374 may vary based upon the user of the tablet 302, the application mode (such as design mode, review mode, edit mode or another mode of operation) and/or other considerations. For example, if the technician is using the tablet 302, the design photo button 370 may allow the technician to take a photograph of the customer with the design layout applied. For another example, if the application is in a review mode, the how to button 370 may allow the user to observe instructions on how to create the design layout shown on display 308.

In this embodiment, the design photo button 370 may be used to take a photo, associate a photo and/or display a photo of the skincare layout. The operation of the design photo button 370 may vary based upon a number of characteristics. In some embodiments, the design photo button 370 may facilitate the creation of one or more photos, videos and/or other images. In some embodiments, the design photo button 370 opens a window, screen and/or page to view one or more photos, videos or other images associated with the given design layout. In some embodiments, the design photo may be rendered in a series of images to provide a variety of views to see the design layout.

In some embodiments, the technician will take an initial design photo for the customer's future reference. The customer may later take one or more additional design photos to associate with the design layout. In some embodiments, the additional photos may replace previously taken photos. In some embodiments, each design layout may only be associated with a limited number of photos, wherein one the limit is reached new photos replace older photos. In some embodiments, the system will organize the photos whereby certain photos are associated with the design layout in tablet 302 while additional photos are accessible through the system in historical records.

In this embodiment, the ensemble photo button 372 may be used to take a photo, associate a photo and/or display a photo of an ensemble with the skincare layout. The operation of the ensemble photo button 372 is similar to the operation of the design photo button 370 as described above. The ensemble photo button 372 may facilitate the creation of one or more photos, videos and/or other images, and/or the ensemble photo button 372 may open a window, screen and/or page to view one or more photos, videos and/or other images associated with the ensemble and design layout.

In some embodiments, the ensemble photo button 372 may be used to take a photo of an ensemble for which a new design look will be created. In such an embodiment, the customer may ask the technician to coordinate a design for use in conjunction with the ensemble. The technician may use the system to identify colors, curves, styles and/or other characteristics of the ensemble which may be used to better design a skincare layout for the person wearing the ensemble. For example, a technician may incorporate a green eye shadow in a skincare layout to coordinate with a green dress.

In some embodiments, if the ensemble is available, the technician will take an initial ensemble photo with the design layout for the customer's future reference. In some embodiments, the customer may later take one or more ensemble photos to associate the ensemble with the design layout. In some embodiments, the user may associate photos of the event showing the ensemble and the skincare design layout with the skincare design for future reference. In some embodiments, the system will organize the photos whereby certain photos are associated with the ensemble layout in tablet 302 while additional photos are accessible through the system in historical records.

In some embodiments, the application will facilitate sharing of the skincare design layout, the photos and/or other information regarding the layout. For example, the application may include a social media posting icon on select pages which may be posted. In some embodiments, the system may facilitate discounts associated with social media sharing of product information, store information, technician information and/or other information associated with the skincare design layout and creation.

In some embodiments, the how to button 374 may be used as part of a process to create an instructive presentation describing how to create the skincare layout. For example, the technician may provide a description of the process for creating the layout in an audio file which may be used by the customer subsequently to create the design again. In some embodiments, the how to instructions may be created in a video or series of screens based upon the inputs of the technician throughout the design process. For example, the technician may input the skincare product and application information in the order in which it should be applied, whereby at the end of the design process, the how to instructions depict the products and application information in the order provided during the design process.

In some embodiments, the how to button 374 opens a window, screen and/or page providing video, images, audio, text and/or other outputs of instructional information regarding the process. In some embodiments, the instructional information may be part of an interactive system to assist a user in creating the design layout. For example, the instruction system may depict, describe and/or otherwise present one step at a time, and wait for the user to instruct the system to present the next step before changing the presentation. In some such embodiments, each step may be presented in a loop until the user controls direct the system to the next step. User controls may vary and remain within the scope and spirit of the present disclosure. For example, the system may use touch screen controls to allow a user to slide pages to the next step. For another example, the system may use a voice control command. In such a system, the user may be able to continue applying the skincare products without the need to touch the tablet 302 or other device.

In some embodiments, the how to button 374 may also open a window, screen and/or page having additional links to information regarding instructional information for applying the selected cosmetics and/or skincare products. In such embodiments, the additional links may be tailored based upon a variety of factors including technician selections, store selections, cosmetic line selections, purchased products, analytic analysis of prior uses of the system, user ratings and/or other factors.

FIG. 9 depicts another embodiment of tablet 302 showing another screen on display 308. In the embodiment shown, the screen may be used by a customer to track or record skincare products, vendors, technicians, purchases and/or other information. In some embodiments, the screen may be utilized by a vendor and/or technician for tracking sales and anticipated marketing reminders related to the purchased products. Embodiments of the application may modify the information, options and/or controls shown in FIG. 9 by removing, replacing and/or changing the information, options and controls. One skilled in the art will recognize that the information, options and/or controls may be tailored to the user, mode of operation and/or other system restriction and remain within the scope and spirit of the disclosure. For example, in some embodiments, pricing and reminder information may only be available when the tablet 302 is in operable communication with a remote server. In such embodiments, the application may leave the information blocks empty when the remote server is unavailable.

In some embodiments, a vendor name box 380 may provide the vendor name, such as a store, cosmetic supplier and/or other vendor, and/or additional information regarding the vendor. In some embodiments, the vendor name box 380 may be operable as a control to facilitate the provision of additional information regarding the vendor. For example, selecting the vendor name box 380 may open a window, screen and/or page associated with the vendor. In some embodiments, selecting the vendor name box 380 may open a window, screen and/or page for inputting the vendor name and/or information regarding the vendor.

In some embodiments, the application may also include a technician name box 382 which identifies the technician associated with the skincare recommendations shown in section 384. As discussed in conjunction with the vendor name box 380, additional information may be associated with the technician through the use of one or more control features. In some embodiments, the customer may also use the technician name box 382 as a filter to review specific information.

In some embodiments, the vendor name box 380 and/or the technician name box 382 may be removed, replaced and/or modified based upon the user of the tablet 302, mode of operation and/or other consideration. For example, when a vendor is using the application, the vendor name box 380 may be removed. The vendor may use the information to analyze the sales rate associated with one or more technicians. For another example, when a technician uses the tablet 302, the application may replace the technician name box 382 with a customer identification box which provides a customer name, customer number or code, a customer photo and/or other customer identification information.

In the embodiment shown, the screen includes a skincare recommendation section 384, a purchase indicator section 386 and a price section 388. The skincare recommendation section 384 in this embodiment depicts information regarding the skincare products recommended by the technician during the design of the skincare layout. The products may be identified in a variety of ways, such as by formal name, inventory name, product identification codes and/or other identifying descriptions, to indicate which specific products were recommended during the design process. In some embodiments, additional information may be accessible through the user interface of tablet 302.

In the embodiment shown, the purchase indicator section 386 includes a series of boxes which may be used to indicate whether the product identified in the skincare recommendation section 384 was purchased. In some embodiments, the purchase indicator section 386 may be replaced by a color coding system and/or other system for differentiating between whether the recommended product was purchased.

Depicted next to the purchase indicator section 386 in this embodiment is the price section 388 which may be used to show the price associated with each recommended product. In some embodiments, the price may reflect a manufacturer's suggested retail price. In other embodiments, the price may reflect the sales price for the product at the time of the purchasing decision. In addition, the price section 388 may include a breakdown of the product options for purchase, such as container size, application accessories, multi-product packages and/or other information regarding the sales structure which may be useful to a user of the tablet 302.

In the embodiment shown, the application includes a discounts box 390 which may identify one or more discounts, packages, giveaways and/or other sales incentives which were used and/or available at the time of purchase. In some embodiments, the discount information may not be shown on the screen, but made available through selecting the discounts box 390. One skilled in the art will recognize that information regarding marking and/or sales may be included in a discount section, a price section and/or another section or location in the system depending on the structure, design, purpose and/or other factors and remain within the scope and spirit of the disclosure.

The embodiment shown also includes a total section 392 which may provide information regarding the total purchase price of the products sold. In some embodiments, additional products which were not explicitly recommended may be identified and accounted for in the system and/or on the screen. In some embodiments, the total section 392 may include one or more alternative totals which were available at the time of purchase.

In some embodiments, the system may provide additional information regarding payments for technicians, payments for sales staff, location overhead and/or other costs. In some embodiments, technicians may receive commissions and/or other payments based upon sales, design efficiency, customer ratings and/or other factors which may be shown in the application for the vendor, the technician and/or a managing party. In some embodiments, the commissions total may be kept on the tablet 302 used by the technician and synched with another sales system to ensure accuracy of product sales and other factors.

In some embodiments, the system may aggregate and analyze information regarding decisions to purchase or not to purchase in light of the identified price, discounts, the technician, a design location, any customer information available and/or other variables. Analytical information may be used by vendors, technicians and/or other parties. For example, vendors may utilize such analytics to create a preferred price-point, sales schedule, incentives and/or other marketing to improve economic returns associated with each product.

In some embodiments, the application facilitates aggregation of content relating to different vendors and/or technicians. In such embodiments, a user may scroll through the list of vendors and/or technicians to filter the information provided by the selected vendor and/or technician. Embodiments of the application may include one or more additional and/or alternative options for filtering the information displayed. The user may also consider the value of the products that were provided by a given vendor and/or recommended by a given technician in order to make decisions regarding which vendors and/or technicians to use in the future.

In some embodiments, the application may include a comments section in which a user may add specific comments regarding the experience. Such a comment section may be facilitated through one or more pages of the application.

The embodiment shown also includes a set reminder button 394 and a date box 396. The set reminder button 394 may be designed to allow a user to create a scheduled reminder for another visit, a predicted refill notice, an upcoming event associated with the skincare design layout and/or for other reminders associated with the skincare system and design. For an example, a vendor system application may automatically calculate a predicted refill date based upon the purchased product, the product size, the purpose of the designed looks that incorporate the product, the recommended application style, an expiration date and/or any additional information indicative of a time to refill the product. The predicted date may be posted in the date box 396. In some embodiments, the date box 396 will allow the user to modify a default or predicted date and/or input a date into the date box 396. The user may select to set the reminder using the set reminder button 394 using the initial date and/or a selected date. For example, the predicted refill date shown the date box 396 is Jan. 1, 2014, but the vendor may choose to send the reminder in early December 2013 because the vendor anticipates providing additional sales incentives during the December timeframe.

FIG. 10 depicts another embodiment of the tablet 302 with another screen shown in display 308. In this embodiment, the screen is part of a vendor application which depicts historical information associated with a customer and/or a technician. In some embodiments, a vendor may use the information to analyze the sales rate associated with one or more technicians for a given customer. In some embodiments, the screen may be modified for other users and purposes. For example, a technician may use a history screen to prepare for a scheduled customer and review the customer's prior preferences to efficiently prepare a new or modified skincare design for a customer. Embodiments of the application may modify the information, options and/or controls shown in FIG. 10 by removing, replacing and/or changing the information, options and controls. One skilled in the art will recognize that the information, options and/or controls may be tailored to the user, mode of operation and/or other system restriction and remain within the scope and spirit of the disclosure.

In some embodiments, a technician name box 400 may provide information regarding one or more technicians associated with the skincare designs prepared for a customer. In some embodiments, the technician name box 400 may be operable as a control to facilitate the provision of additional information regarding one or more technicians. For example, selecting the technician name box 400 may open a window, screen and/or page associated with the vendor. In some embodiments, selecting the technician name box 400 may open a window, screen and/or page for inputting a technician name and/or information regarding a technician.

In some embodiments, the application may also include a customer name box 402 which identifies a customer. As discussed in conjunction with the technician name box 400, additional information may be associated with the customer through the use of one or more control features.

In some embodiments, the vendor may also use the technician name box 400 and/or the customer name box 402 as a filter to review specific information. In some embodiments, the technician name box 400 and/or the customer name box 402 may be removed, replaced and/or modified based upon the user of the tablet 302, mode of operation and/or other consideration. For example, when a customer is using the application, the customer name box 402 may be removed.

In the embodiment shown, the screen depicts information boxes, including a prior visits box 404, an initial purchases box 406 and a repeat purchases box 408, adjacent to a totals section 414. In the totals section 414, the totals reflect the information identified in the information boxes 404, 406 and 408. For example, the top line in the totals section would reflect the total number of prior visits. In some embodiments, the total number may be restricted by other filters or characteristics. For example, the total prior visits may include any visits to locations associated with a vendor or only visits wherein the vendor's products were available and the identified technician assisted the customer.

In some embodiments, additional information regarding the information boxes 404, 406 and 408 may be accessed through the user interface of the tablet 302. The additional information may include a description of what is reflected in the totals section 414. In some embodiments, the additional information may include information regarding the activities identified. The additional information relating to the prior visits box 404 may include dates of the prior visits, designs for each prior visit, sales and/or marketing information associated with each prior visit and/or other information regarding the prior visits. The additional information relating to the initial purchases box 406 may include the dates of the initial purchases, methods of purchasing (e.g. store purchases, online purchases, etc.), product information relating to the purchases and/or other information regarding initial purchases. The additional information relating to the repeat purchases box 408 may include the dates of the repeat purchases, methods of purchasing (e.g. store purchases, online purchases, etc.), product information relating to the repeat purchases, historical analytics of repeat purchases and/or other information regarding repeat purchases. In some embodiments, the additional information relating to the initial purchases box 406 and the repeat purchases box 408 may include recommended products which were not purchased.

In some embodiments, the initial purchases category may be limited to those purchases that occurred at the time of the creation of the skincare layout. In other embodiments, the initial purchases category may comprise purchases associated with the design layout which were purchased within a threshold timeframe from the creation of the skincare layout. For example, a customer may decide not to purchase the product in the store at the time of the design creation, but may choose to order the product online a few days later. If the threshold for initial purchases were one week, the online order may be included in the initial purchases information. In some embodiments, the customer, technician and/or other user may input information regarding products which the customer already has and would not need to be purchased initially. At the time of subsequent purchases of such a product, the product purchase may be associated with the repeat purchases category in whole or in part.

In some embodiments, the system may need to receive an input that a specified product was purchased and/or verification of the product purchase. In some embodiments, the customer may use an application on their own device, such as a smart phone, to input the decision to purchase a product. In some embodiments, the customer may use the application to facilitate and/or track subsequent purchases. In such embodiments, the system may associate such purchases with the given design layout. For example, six months after the initial design and purchase, a customer may receive a reminder from the system that the face cleanser is expected to run out soon. The customer may navigate through the system to the preferred skincare design with the face cleanser recommendation, and use a link from the design information to access a vendor's website to purchase additional cleanser. The system may record the purchase as a repeat purchase associated with the preferred design. In some embodiments, the system may identify the product as associated with multiple designs and allocate the repeat purchase information among the designs. In some embodiments, a reminder message may facilitate a direct link to a purchasing page without the need to navigate the application.

Some embodiments of the system and/or application may allow the information categories to be customized by a user. For example, the vendor may elect for all purchases to be consolidated into a single entry. For another example, the vendor may elect to include a sales percentage category to indicate the effectiveness of a technician in selling the recommended products. In some embodiments, the vendor may include technician costs and sales to select preferred technicians.

In the embodiment shown, the application also included a recommendations button 410. In some embodiments, the recommendations button 410 may be used to access analytics regarding a customer's purchasing activity. For example, the system may review the initial and repeat purchases to determine a likelihood that the customer may be interested in a new product offering, and/or what incentives should be provided to encourage purchases of a product. The analytics may account for usage history based upon the product sizes purchased and time between purchases. The analytics may also account for sales packages which were purchase or declined by a user. Embodiments of the system may use analytics which are customer specific, aggregated across customers, demographic customer information and/or other sales information. The information and analysis conducted by a vendor may operate in conjunction with a reward program to provide rewards to users and/or technicians based upon the information gathered and/or determined by the system.

In some embodiments, the recommendations button 410 may be used to access content provided by other system users. For example, a technician may provide color recommendations for a product of interest. For another example, a user may provide product package recommendations. A vendor may review the recommendations through the recommendations button 410. In some embodiments, the vendor may create specialized responses for the recommendations. For example, a vendor may send a personal coupon, link and/or other offer to the customer with the recommended package in order to facilitate an additional sale.

In the embodiment shown, the application also included a prior looks button 412. The prior looks button 412 may be used to access the prior skincare designs associated with the customer. The looks may be illustrative face charts, photos of the customer, three-dimensional modeling and/or other presentations providing the skincare design layout. Prior looks may be used in a variety of manners for recollection, analysis and/or other reasons depending on the user and/or other factors. For example, a vendor may review the prior looks to evaluate a technicians skill in creating designs. Based upon such an analysis the vendor may determine preferred uses for the technician, such as an evening look design specialist. For another example, the vendor may evaluate the look to analyze the product usage and wear characteristics. In conjunction with sales analysis, the vendor may determine avenues to improve the product characteristics. In some embodiments, a vendor may use such analysis to determine product inventory management. For example, a vendor may limit the supply of certain products at locations that historically do not sell the specific product well.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the system and method described.

The invention claimed is:

1. A skincare layout design and management system comprising:
   a networked skincare layout device comprising:
      a user input, which receives data from a user comprising a wearer identification associated with a wearer, a skincare option selection and a skincare design element selection, wherein said skincare option selection is one of a plurality of skincare options and said skincare design element selection represents a skincare product selected from a plurality of skincare products;
      a display, which displays a facial representation for said wearer;
      a network communication component that communicates with a system network; and
      a device processor operatively associated with said user input, said display and said network communication component; and
   a networked server comprising:
      a database storing information comprising an existing skincare product of said wearer and a stored skincare layout, which is associated with said wearer identification;
      a server network communication component that communicates with said system network; and
      a server processor operatively associated with said database and said server network communication component;
   wherein said device processor is configured to display said facial representation for said wearer and said plurality of skincare options on said display, receive said skincare option selection from among said plurality of skincare options, display said plurality of skincare products, receive said skincare design element selection from said plurality of skincare products, create a modified facial representation based upon said facial representation and said skincare design element selection, and display said modified facial representation;
   wherein said plurality of skincare products comprises said existing skincare product of said wearer and an other skincare product;
   wherein said modified facial representation for said wearer comprises a representative application of said skincare design element selection on said facial representation;
   wherein said networked skincare layout device creates a second skincare layout based on said modified facial representation and transmits said second skincare layout to said networked server, wherein said second skincare layout comprises product information for said skincare product associated with said skincare design element selection;
   wherein said networked server stores said second skincare layout in said database and communicates said stored skincare layout with said networked skincare layout device; and
   wherein said networked server transmits said product information for said skincare product associated with said stored skincare layout to said networked skincare layout device.

2. The skincare layout design and management system of claim 1 wherein said facial representation is based upon an image of the wearer for whom the second skincare layout is designed.

3. The skincare layout design and management system of claim 1 wherein said networked skincare layout device comprises a touch-screen display which operates as said user input and said display.

4. The skincare layout design and management system of claim 3 wherein said touch-screen display is configured to allow said user to apply said skincare design element selection upon said facial representation on said display.

5. The skincare layout design and management system of claim 1 wherein said networked server comprises a reporting component which generates a report based upon an analysis of said stored skincare layout which comprises at least one of a marketing offer, a product reminder or a new product suggestion based upon information associated with an identified skincare product associated with said second skincare layout.

6. The skincare layout design and management system of claim 1 wherein said networked skincare layout device receives an update through said user input indicating an application of a specific skincare layout by said wearer and transmits said update over said system network to said networked server; and
   said networked server tracks skincare product usage for each said skincare product associated with the specific skincare layout identified by said update to determine an anticipated time to refill each said skincare product and provides a notice to said networked skincare layout device indicating said anticipated time to refill said skincare product.

7. The skincare layout design and management system of claim 1 wherein said skincare layout design and management system includes a sales component which is operable to facilitate a sale of said skincare product.

8. The skincare layout design and management system of claim 1 comprising a plurality of said networked skincare layout devices, wherein each of said plurality of said networked skincare layout devices transmits said information to said networked server; and wherein said networked server aggregates said information from said plurality of said networked skincare layout devices.

9. The skincare layout design and management system of claim 8 wherein said networked server comprises a reporting component which generates a report based upon an analysis of said aggregated information.

10. The skincare layout design and management system of claim 9 wherein said reporting component is further based upon historical data associated with at least one of said user and a product line.

11. The skincare layout design and management system of claim 1 wherein said database further stores instructional information comprising a plurality of applications associated with skincare design elements; and said networked server creates an instruction set for each of said stored skincare layout, wherein said instruction set is based upon said skincare design elements associated with said second skincare layout and comprises each of said plurality of applications associated with said skincare design elements corresponding to said skincare design elements in said second skincare layout.

12. A networked skincare layout device comprising:
   a user input, which receives data comprising identification data and skincare layout data comprising a skincare design element;
   a display, which displays a facial representation of a wearer;
   a network communication component configured to communicate with a remote networked server, wherein said remote networked server communicates with a database storing information comprising an existing skincare layout design associated with said identification data; and
   a processor operatively associated with said user input, said display and said network communication component;
   wherein said processor is configured to display said existing skincare layout design received from said remote networked server, modify said existing skincare layout design by displaying said facial representation of said wearer associated with said existing skincare layout design, modify said facial representation of said wearer to represent said skincare design element selected by a user, wherein said user selects, via said user input, said skincare design element from a plurality of skincare products within a selected skincare option, said plurality of skincare products comprising an existing skincare product of said wearer and an other skincare product, and wherein said processor associates said identification data with a modified skincare layout design and transmits said modified skincare layout design to said remote networked server for storage in said database.

13. The networked skincare layout device of claim 12 wherein said facial representation is based upon an image of said wearer for whom a skincare layout is designed.

14. The networked skincare layout device of claim 12 wherein said networked skincare layout device comprises a touch-screen display which operates as said user input and said display.

15. The networked skincare layout device of claim 14 wherein said touch-screen display facilitates an input of said skincare design element upon said facial representation.

16. The networked skincare layout device of claim 12 wherein said skincare design element is a representation of a skincare product.

17. The networked skincare layout device of claim 16 wherein said networked skincare layout device includes a sales component which is operable to facilitate a sale of said skincare product.

18. The networked skincare layout device of claim 12 wherein said network communication component is operable to facilitate communication with a wearer apparatus that is separate from said networked skincare layout device, wherein said communication comprises a skincare layout design.

19. The networked skincare layout device of claim 18 wherein said communication comprises wearer data including wearer identification data.

* * * * *